(12) United States Patent
Furuichi et al.

(10) Patent No.: US 6,488,587 B1
(45) Date of Patent: Dec. 3, 2002

(54) GAME CASSETTE UNIT WITH DECODE CONTROLLER

(75) Inventors: Tetsuo Furuichi; Tetsuji Kajitani, both of Osaka (JP)

(73) Assignee: Mega Chips Corporation, Osaka (JP)

( * ) Notice: Subject to any disclaimer, the term of this patent is extended or adjusted under 35 U.S.C. 154(b) by 0 days.

(21) Appl. No.: 09/024,452

(22) Filed: Feb. 17, 1998

(30) Foreign Application Priority Data

Feb. 18, 1997 (JP) ......................................... PO9-033674

(51) Int. Cl.⁷ ............................................... A63F 13/00
(52) U.S. Cl. ......................... 463/44; 463/29; 273/148 B
(58) Field of Search ............................. 463/29, 43, 44, 463/45, 36, 37, 7, 24; 273/148 B (56) References Cited

U.S. PATENT DOCUMENTS

| | | | | |
|---|---|---|---|---|
| 4,247,106 A | * | 1/1981 | Jeffers et al. | |
| 4,432,067 A | * | 2/1984 | Nielsen | 463/43 |
| 4,485,457 A | * | 11/1984 | Balaska et al. | 463/43 |
| 4,516,777 A | * | 5/1985 | Nikora | 273/148 B |
| 4,593,376 A | * | 6/1986 | Volk | |
| 4,674,055 A | * | 6/1987 | Ogaki et al. | |
| 4,680,731 A | | 7/1987 | Izumi et al. | |
| 4,922,420 A | * | 5/1990 | Nakagawa et al. | 273/148 B |
| 4,949,298 A | | 8/1990 | Nakanishi et al. | |
| 5,112,051 A | * | 5/1992 | Darling et al. | 273/148 B |
| 5,114,157 A | * | 5/1992 | Kita | 273/248 B |
| 5,276,831 A | | 1/1994 | Nakanishi et al. | |
| 5,624,316 A | * | 4/1997 | Roskowski et al. | |
| 5,632,681 A | * | 5/1997 | Bakoglu et al. | |
| 5,680,533 A | * | 10/1997 | Yamato et al. | 463/24 |
| 5,718,632 A | * | 2/1998 | Hayashi | |
| 5,785,598 A | * | 7/1998 | Hsu | |
| 5,828,862 A | * | 10/1998 | Singkornrat et al. | |
| 5,941,775 A | * | 8/1999 | Naka et al. | 463/44 |
| 5,961,386 A | * | 10/1999 | Sawaguchi | 463/43 |
| 6,022,274 A | * | 2/2000 | Takeda et al. | 463/36 |

FOREIGN PATENT DOCUMENTS

| | | |
|---|---|---|
| EP | 0 681 298 | 11/1995 |
| JP | 63-245535 | 10/1988 |
| JP | 6-312062 | 11/1994 |

OTHER PUBLICATIONS

Adobe Type On Call, Adobe Systems Inc., 1994.*
W. Stallings, Table of Contents and Preface, Computer Organization and Architecture –Designing for Performance, 4ᵗʰ Edition, 1996.

* cited by examiner

*Primary Examiner*—Michael O'Neill
(74) *Attorney, Agent, or Firm*—Oblon, Spivak, McClelland, Maier & Neustadt, P.C.

(57) ABSTRACT

A game cassette unit which can be connected to a game machine having a CPU for execution of a game selected by a user, including a memory which rewritably stores a plurality of game machine programs and a game selection program that allows a user to select a desired one of these programs. The memory further rewritably stores decode data defining address conversion rules for executing respective of the programs. A decode part executes address conversion based on decode data corresponding to the game selection program after start of power. After the user selects one of the game machine programs, the decode part executes address conversion based on the decode data corresponding to a selected game machine program. Thus, the user can select a desired one from the plurality of game machine programs. As a result, game software is provided to the user at low cost.

11 Claims, 7 Drawing Sheets

GAME CASSETTE UNIT WITH DECODE CONTROLLER

BACKGROUND OF THE INVENTION

1. Field of the Invention

The present invention relates to a game cassette unit suitable for application to a household game machine, and more particularly, it relates to an improvement for providing a game machine program (the so-called "game software") to the user at a low cost and in a short time.

2. Description of the Background Art

In order to utilize a well-known game machine which is suitable for family use, a separately marketed portable game cassette unit is generally attached thereto. The game cassette unit stores a ROM (unrewritable mask ROM) serving as a storage medium, in which a game machine program is written.

Another game machine comprises a CPU (microprocessor) for executing the game machine program written in the ROM of the game cassette unit attached thereto. Thus, the game machine user can amuse himself by playing the game directed by the game machine program.

In general, such a game cassette unit is marketed for each game, i.e., each game machine program, and the user can enjoy a desired game by purchasing the game cassette unit storing the game machine program therefor. In other words, a single game cassette unit generally corresponds to a single game.

In general, therefore, the user must newly purchase a game cassette unit every time a new game of interest to him is put on the market, disadvantageously with a great expense. This also leads to the problem of a high cost in manufacturing and selling on the side of the game supplier, with requirement for a long time up to supply of the game.

Further, manufacturing of such a game machine program is generally stopped after a certain period from the launch. If any user requires new shipment, therefore, the supplier must reproduce the closed game cassette unit. This also leads to a high production cost.

SUMMARY OF THE INVENTION

According to a first aspect of the present invention, a game cassette unit which is connected to a game machine having a CPU for game execution by a user comprising a memory for storing a program group including a game selection program and a plurality of game machine programs, and a plurality of decode data defining address conversion rules for the CPU for executing the programs belonging to the program group respectively, and a decode controller for executing address conversion on the basis of one data selected from the plurality of decode data. Each program belonging to the program group is capable of being executed by the CPU upon connection of the unit to the game machine, the game selection program is adapted to make the user select one of the plurality of game machine programs, the decode controller selects one of the plurality of decode data corresponding to the game selection program upon connection of the unit to the game machine for executing address conversion on the basis of the selected decode data thereby enabling the CPU to execute the game selection program, and the decode controller further selects one of the plurality of decode data corresponding to the game machine program selected by the user when the user selects one of the plurality of game machine programs during execution of the game selection program for executing address conversion on the basis of the selected decode data thereby enabling execution of the game machine program selected by the user.

According to a second aspect of the present invention, the decode controller comprises a power-on controller, a decode information loader and a decode part, the decode information loader, when one code of a plurality of codes for identifying the plurality of decode data respectively is inputted, selectively reads one of the plurality of decode data corresponding to the inputted one code and setting the same on the decode part, the decode part executes address conversion on the basis of the set decode data, the power-on controller inputs one of the plurality of codes for identifying one of the plurality of decode data corresponding to the game selection program in the decode information loader upon connection of the unit to the game machine, and the game selection program makes the CPU input one of the plurality of codes for identifying one of the plurality of decode data for the game machine program selected by the user in the decode information loader.

According to a third aspect of the present invention, the memory comprises a flash ROM, which rewritably stores the program group and the plurality of decode data.

According to a fourth aspect of the present invention, a special storage area of the flash ROM rewritably stores the plurality of decode data.

According to a fifth aspect of the present invention, the decode controller is formed by a semiconductor integrated circuit requiring no software.

The unit according to the first aspect of the present invention can store a plurality of game machine programs so that the user can select a desired one of the programs for executing the same. Thus, the unit can provide any game machine program to the user at a low cost in a short time.

In the unit according to the second aspect of the present invention, the decode controller comprises the power-on controller, the decode information loader and the decode part, whereby the unit enables the CPU to first execute the game selection program and to subsequently execute the game machine program selected by the user in a simple unit structure.

The unit according to the third aspect of the present invention, which rewritably stores a plurality of game machine programs, can provide any game machine program to the user at a lower cost in a shorter time. Further, it is possible to effectively utilize a game machine program stored in a conventional game cassette unit which has run out of stock.

In the unit according to the fourth aspect of the present invention, the special storage area of the flash ROM stores a plurality of decode data, whereby security for the game machine programs can be highly ensured.

In the unit according to the fifth aspect of the present invention, the decode controller is formed by the semiconductor integrated circuit requiring no software, whereby security for the game machine programs can be highly ensured.

Accordingly, an object of the present invention is to obtain a game cassette unit which can provide any game machine program to the user at a low cost in a short time.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
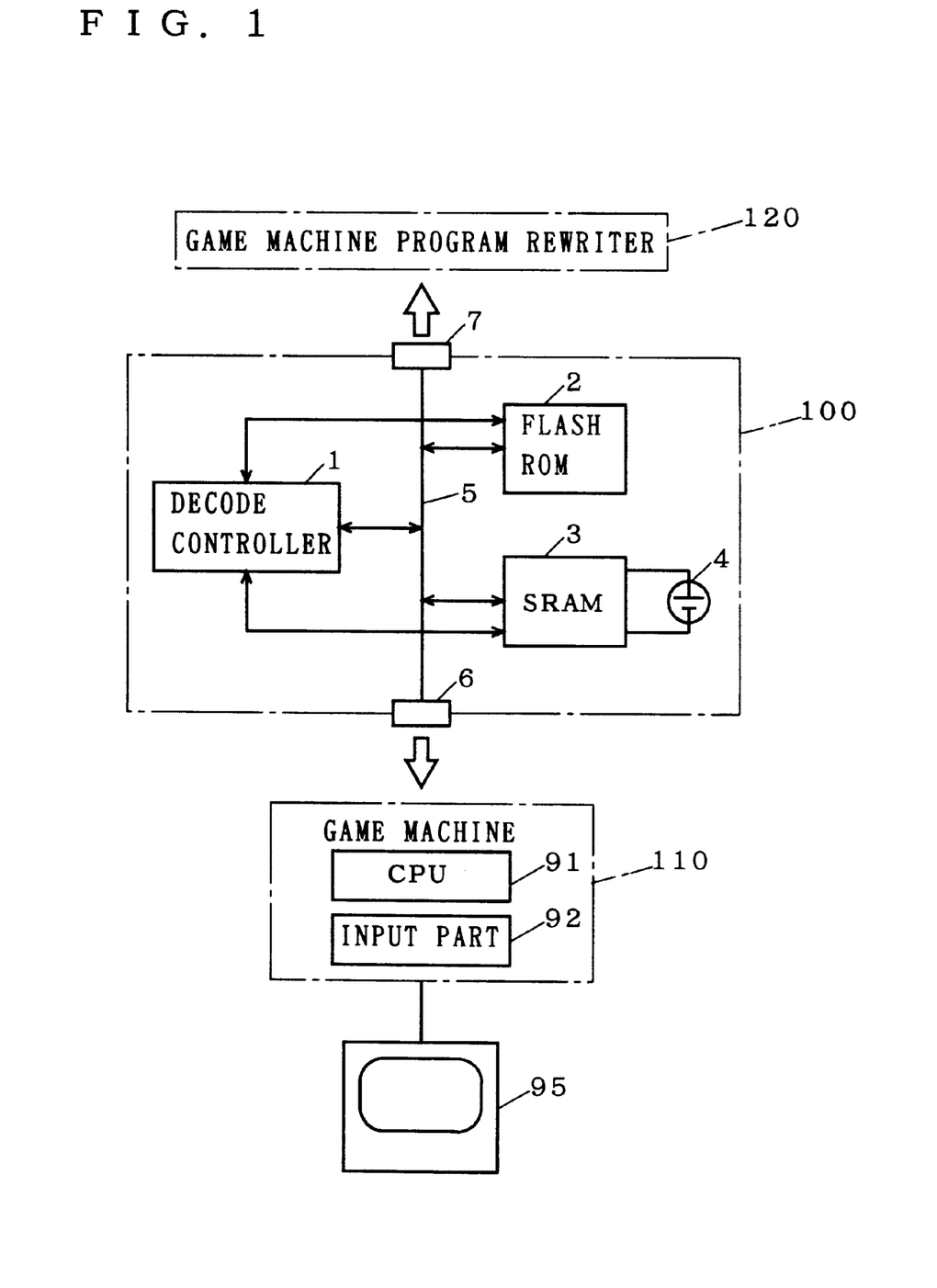
FIG. 1 is a block diagram showing the structure of a game cassette unit according to an embodiment of the present invention and those of peripheral units thereof.

FIG. 1 is a block diagram schematically showing the structure of a game cassette unit 100 according to an embodiment of the present invention. This figure also schematically shows the structure of a game machine 110 on which the game cassette unit 100 is mounted. The game cassette unit 100 according to the embodiment comprises a decode controller 1, a flash ROM (memory) 2, an SRAM (static RAM) 3, a battery 4, a bus line 5 and connectors 6 and 7. The battery 4 backs up the SRAM 3, so that the SRAM 3 can hold data written therein without volatilizing the same. The connectors 6 and 7 may be integrated into a single connector.

The flash ROM 2 rewritably stores a plurality of game machine programs. The flash ROM 2 also stores control data for the game machine programs such as those necessary for operations of the decode controller 1, as described later.

Data to be recorded such as the results (scores) acquired by the user in the games, for example, following execution of the game machine programs are written in the SRAM 3. The game cassette unit 100 is provided (sold) to the user generally with the SRAM 3 which is in a vacant state with no written data. Some game machine programs require no SRAMs, and the game cassette unit 100 may comprise no SRAM 3 if the same is directed to only such game machine programs.

The decode controller 1 is a unit part for converting an address signal for accessing the flash ROM 2 and the SRAM 3, as described later. The decode controller 1 is preferably formed by a semiconductor integrated circuit (hardware) requiring no software. Thus, the manufacturing cost for the unit 100 is saved and protection (security) against illegal copying of the game machine programs is remarkably improved.

The bus line 5 interconnects the decode controller 1, the flash ROM 2, the SRAM 3 and the connectors 6 and 7 with each other. The decode controller 1 and the flash ROM 2 as well as the decode controller 1 and the SRAM 3 are interconnected with each other also through signal lines not relayed through the bus line 5.

The connectors 6 and 7 can be connected to the game machine 110 and a game program rewriter 120 respectively. The game machine 110, which is a well-known game machine, comprises a CPU (microprocessor) 91 and an input part 92. The game cassette unit 100 is mounted on the game machine 110, so that the decode controller 1, the flash ROM 2 and the SRAM 3 are connected to the CPU 91 of the game machine 110 through the connector 6.

When utilizing the game machine 110, i.e., executing any game, the user mounts the game cassette unit 100 on the game machine 110 while connecting a display unit 95 such as a television set thereto. Consequently, the CPU 91 provided on the game machine 110 can execute any game machine program stored in the flash ROM 2.

The user can execute any game by operating the input part 92 while observing images displayed on the display unit 95 following execution of the game program. The user can further select a desired one from the plurality of game machine programs written in the flash ROM 2 by observing a menu displayed on the display unit 95.

The user can rewrite the game machine programs and the control data stored in the flash ROM 2 by connecting the game cassette unit 100 to the game machine program rewriter 120 through the connector 7. The game machine program rewriter 120 is set on a shop authorized by the manufacturer providing the game machine programs, for example. The user can acquire any desired game machine program by not purchasing the game cassette unit 100 itself but bringing his game cassette unit 100 to the nearest shop.

Figure 2:
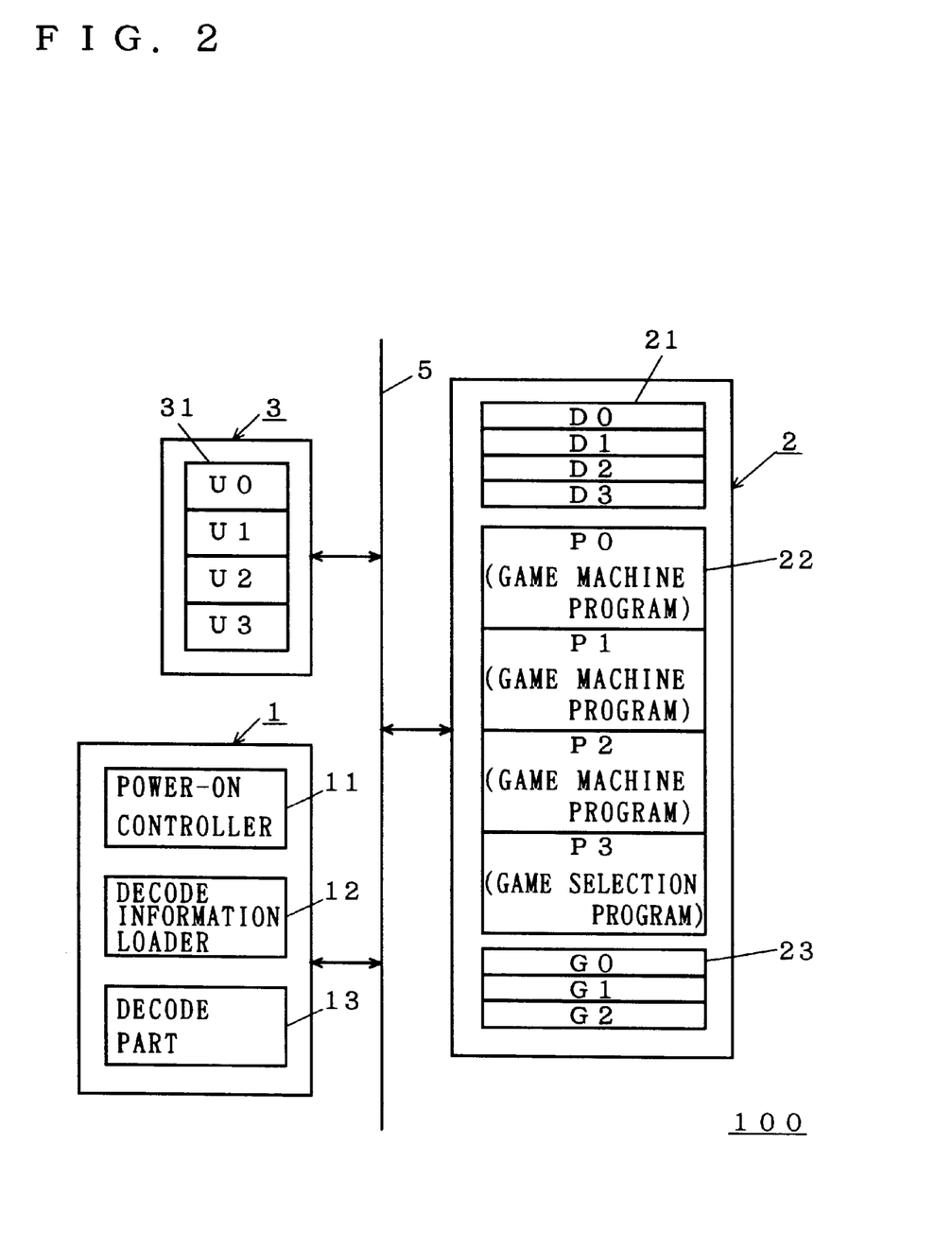
FIG. 2 is a block diagram showing the structure of the game cassette unit shown in FIG. 1 in detail.

FIG. 2 is a block diagram showing the internal structure of the game cassette unit 100 in detail. The flash ROM 2 rewritably stores a decode information table 21, a program group 22 and a stored program information table 23. In the example shown in FIG. 2, the program group 22 includes a plurality of game machine programs P0 to P2 and a game selection program P3.

The capacity of a game machine program for executing a single game is generally within the range of 1 to 32 Mbits. It is predicted that game machine programs of 64 Mbits are released in the near future. Flash ROMs having the storage capacity of 16 Mbits have already been put on the market, and it is predicted that those having the storage capacity of 32 or 64 Mbits appear in the near future.

At present, therefore, it is already possible to store a plurality of game machine programs each having the capacity of 8 Mbits by preparing the flash ROM 2 from two commercially available flash ROMS each having the storage capacity of 16 Mbits, for example, to have the storage capacity of 32 Mbits.

Referring to FIG. 2, the flash ROM 2 has the storage capacity of 32 Mbits and stores three game machine programs P0 to P2 each having the capacity of 8 Mbits and the game selection program 3 as the program group 22. In addition to the memory area for the plurality of game machine programs P0 to P2, the memory area for storing the game selection program P3 must also be ensured as shown in FIG. 2.

In the example shown in FIG. 2, the memory space of the flash ROM 2 is equally split into 8-Mbit small spaces, so that the first to third small spaces store the game machine programs P0 to P2 respectively and the fourth small space stores the game selection program P3 and the stored program information table 23. In general, the width of each small space may not be fixed but can be newly set every time a new game machine program is written therein.

The decode information table 21 is stored in a special storage area of about several bytes to several 100 bytes, which is separately provided in addition to the ordinary memory space (ordinary storage area) of 32 Mbit provided in the nominal 32 Mbit-flash ROM 2. This special storage area is already prepared in the commercially available flash ROM. Dissimilarly to the ordinary storage area, the special storage area is a special memory space which cannot be accessed by simply inputting an address signal but is first accessible when a specific code is inputted over a plurality of stages.

This special storage area stores the decode information table 21 in the example shown in FIG. 2, whereby the game machine programs P0 to P2 cannot be written and read in general procedures. Namely, the barrier against illegal copying of the game machine programs P0 to P2 can be further improved. In case of utilizing no special storage area, the decode information table 21 may be stored in the fourth small space, i.e., the storage area other than those storing the game machine programs P0 to P2 in the general storage areas, along with the game selection program P3 and the stored program information table 23.

The decode information table 21 includes four decode data D0 to D3 corresponding to the four programs P0 to P3 included in the program group 22 respectively. The decode data D0 to D3 define rules for converting address signals outputted from the CPU 91 provided on the game machine 110 for executing the programs P0 to P3 respectively.

The stored program information table 23 includes three stored program data G0 to G2 corresponding to the game machine programs P0 to P2 respectively. Program titles to be displayed on the display unit 95 in execution of the game selection program P3 and the like are described in these stored program data G0 to G2. The decode information table 21 and the stored program information table 23 form the aforementioned control data.

The SRAM 3 ensures a data area 31 in its memory space. This data area 31 ensures four areas U0 to U3 corresponding to the four programs P0 to P3 respectively. These areas U0 to U3 are memory areas for writing data generated during execution of the game machine programs P0 to P2 and the game selection program P3 to be recorded therein respectively.

The decode controller 1 comprises a power-on controller 11, a decode information loader 12 and a decode part 13. The decode information loader 12 is a unit part for selecting one of the decode data D0 to D3 from the decode information table 21 and setting the same on the decode part 13. The decode part 13 executes address conversion on the basis of the set decode data.

Figure 3:
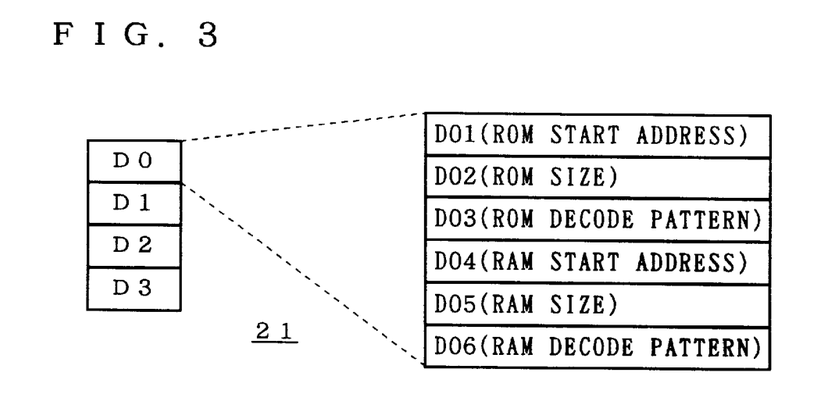
FIG. 3 is an explanatory diagram showing the contents of a decode information table shown in FIG. 2.

FIG. 3 is an explanatory diagram showing the contents of the decode data D0 representatively among the decode data D0 to D3 contained in the decode information table 21. As shown in FIG. 3, the decode data D0 includes data D01 to D03 related to the memory area of the flash ROM 2 storing the game machine program P0 and data D04 to D06 related to the area U0 corresponding to the game machine program P0 in the SRAM 3.

Among these, the data D01 describes the start address of the memory area storing the game machine program P0, and the data D02 describes the size of this memory area. Similarly, the data D04 describes the start address of the area U0, and the data D05 describes the size of this area U0.

As already described, the game machine 110 on which the game cassette unit 100 is mounted for use may be an existing game machine. Namely, the game cassette unit 100 is formed to be applicable to a commercially available game machine. However, conventional game cassette units in which only single game machine programs are written are in various specifications.

The term "specification" indicates the capacity of a ROM or an SRAM loaded on each game cassette unit and allocation (memory map) of the ROM or RAM capacity with respect to the total address space standardized for the game machine. Under the present circumstances, the conventional game cassette units are implemented in various specifications in response to the types of the games.

The respective game machine programs P0 to P2 written in the flash ROM 2 are originally to be written in conventional game cassette units for providing only single game machine programs, and provided to the user. In general, the specifications of such game cassette units vary with the game machine programs written therein.

Game machine programs corresponding to such game cassette units of various specifications are written in the game cassette unit 100. This game cassette unit 100 must normally operate similarly to any conventional game cassette unit when mounted on a conventional game machine. In other words, the game cassette unit 100 must be equivalent to any conventional game cassette unit as viewed from the CPU 91 provided on the game machine 110.

The data D03 and D06 are prepared for maintaining compatibility with such various specifications. Namely, the data D03 and D06 define rules (decode patterns) for changing the address of the memory accessed by the CPU 91, i.e., for re-reading the memory map in response to the specification accompanying the game machine program P0. Among these, the decode data D03 describes a decode pattern related to access to the flash ROM 2, and the decode data D06 describes a decode pattern related to access to the SRAM 3.

The decode data D0, i.e., the data D01 to D06 correspond to the specification accompanying the game machine program P0 while corresponding to the fact that the game machine program P0 is one of the plurality of programs P0 to P3 arranged in different memory areas of the memory space of the single flash ROM 2 respectively, and supply a rule for converting an address outputted from the CPU 91 for specifying the access object to a proper address in the area for the game machine program P0 in the flash ROM 2 or in the area U0 of the SRAM 3.

This also applies to the decode data D1 and D2. Namely, the decode data D0 to D2 define address conversion rules for the CPU 91 for executing the game machine programs P0 to P2 respectively.

Further, the decode data D3 defines an address conversion rule for the CPU 91 for executing the game selection program P3, which is not provided in a conventional game cassette unit, similarly to the decode data D0 to D2. Namely, the decode data D3 also includes contents similar to those of the decode data D0 shown in FIG. 3.

The decode data D0 to D3 contained in the decode information table 21 decide the positions and widths of the small spaces allotted to the programs P0 to P3 respectively in the memory space of the flash ROM 2. When rewriting the programs P0 to P3, the game machine program rewriter 120 also rewrite the decode information table 21 in correspondence thereto. When rewriting the programs P0 to P3, therefore, the game machine program rewriter 120 can also change the positions and widths of the small spaces allotted thereto.

Figure 4:
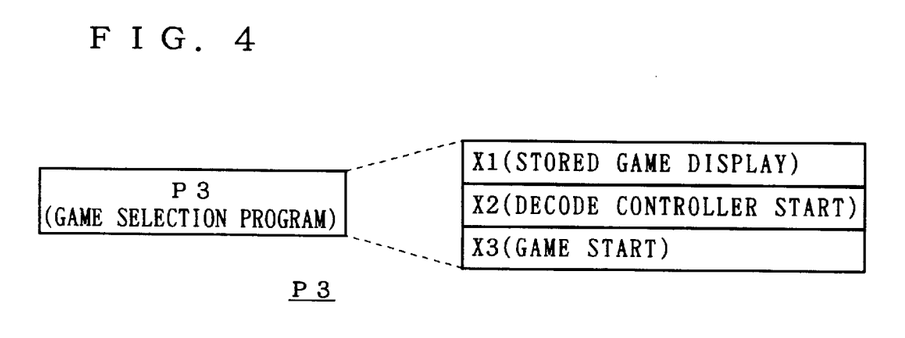
FIG. 4 is an explanatory diagram showing the contents of a game selection program shown in FIG. 2.

FIG. 4 is an explanatory diagram showing the contents of the game selection program P3. As shown in FIG. 4, the game selection program P3 includes three programs X1 to X3. The program X1 is adapted to display the titles of the games directed by the stored game machine programs P0 to P2 and the like on the display unit 95. The program X2 is adapted to start the decode controller 1. The program X3 is adapted to start one of the stored game machine programs P0 to P2 selected by the user.

Figure 5:
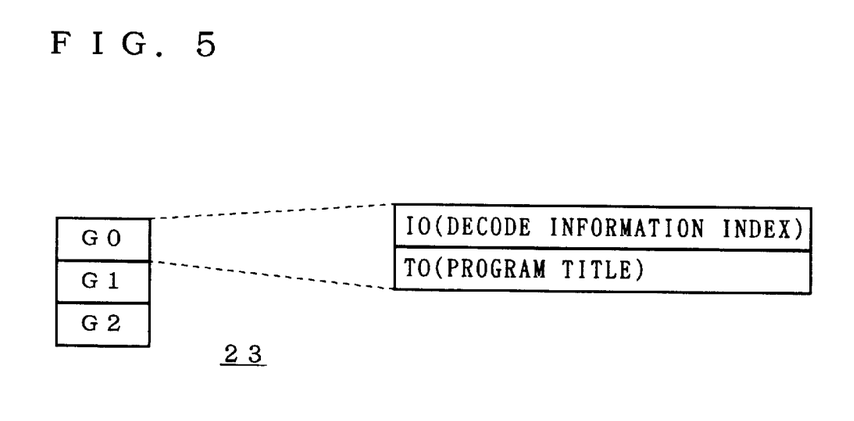
FIG. 5 is an explanatory diagram showing the contents of a stored program information table shown in FIG. 2.

FIG. 5 is an explanatory diagram showing the contents of the stored program data G0 representatively among the stored program data G0 to G2 contained in the stored program information table 23. As shown in FIG. 5, the stored program data G0 includes a decode information index I0 and a program title T0. This also applies to the stored program data G1 and G2.

Decode information indices I0 to I2 are codes for identifying the decode data D0 to D2 contained in the decode information table 21 respectively. Program titles T0 to T2 are data describing the respective titles of the stored game machine programs P0 to P2.

When rewriting the programs P0 to P3, the game machine program rewriter 120 also rewrites the stored program information table 23 in correspondence thereto, similarly to the decode information table 21.

FIGS. 6 to 9 are flowcharts showing flows of the operations of the unit 100. The operations of the unit 100 are now described with reference to these flowcharts.

Figure 6:
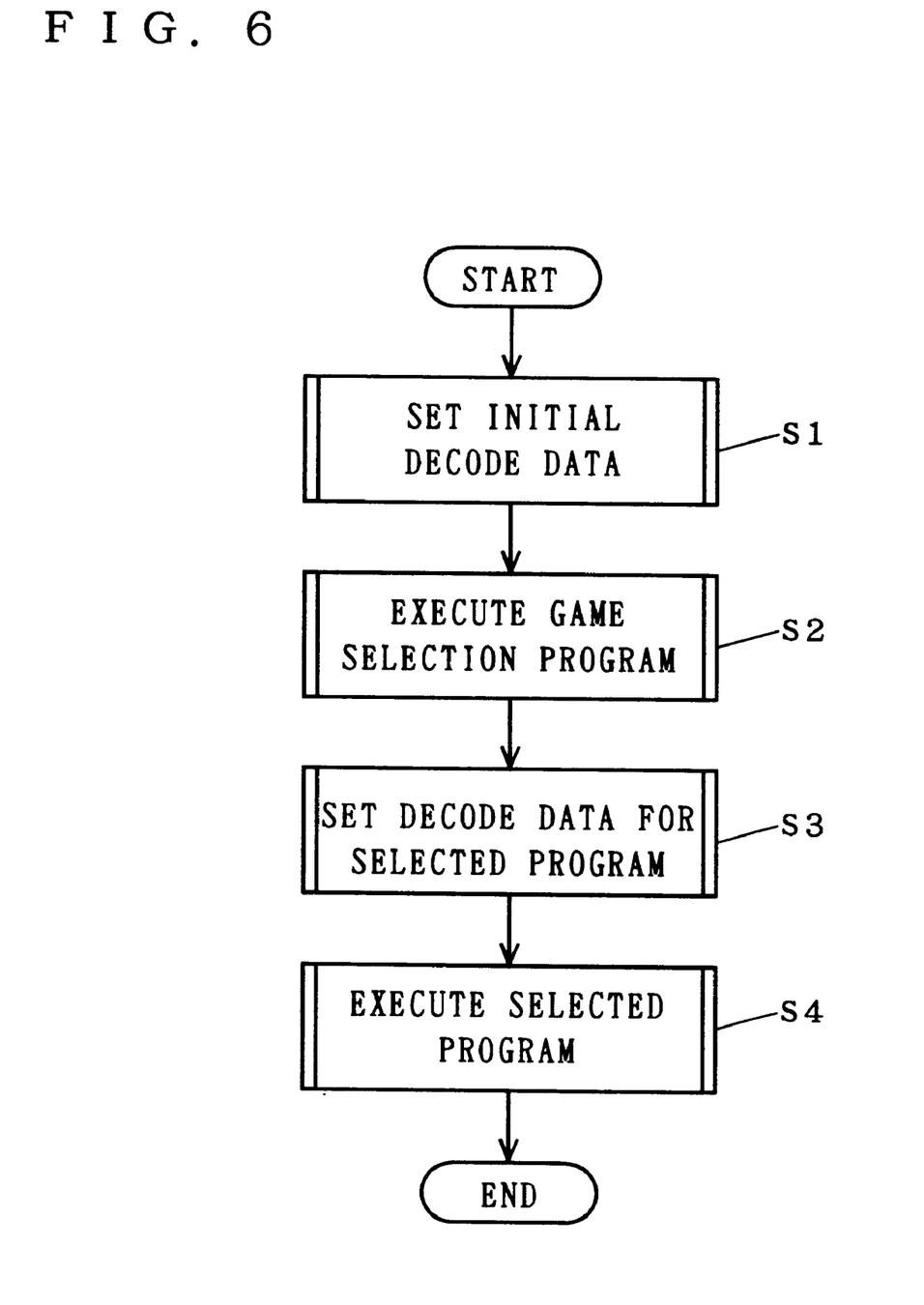
FIG. 6 is a flow chart showing the operations of the game cassette unit shown in FIG. 1.

First, the user mounts the game cassette unit 100 on the game machine 110 and thereafter supplies power to the game machine 100, in order to execute any game through the game cassette unit 100. When the power is supplied to the game machine 110, the decode controller 1 performs processing at a step S1 for setting initial decode data, as shown in FIG. 6.

Figure 7:
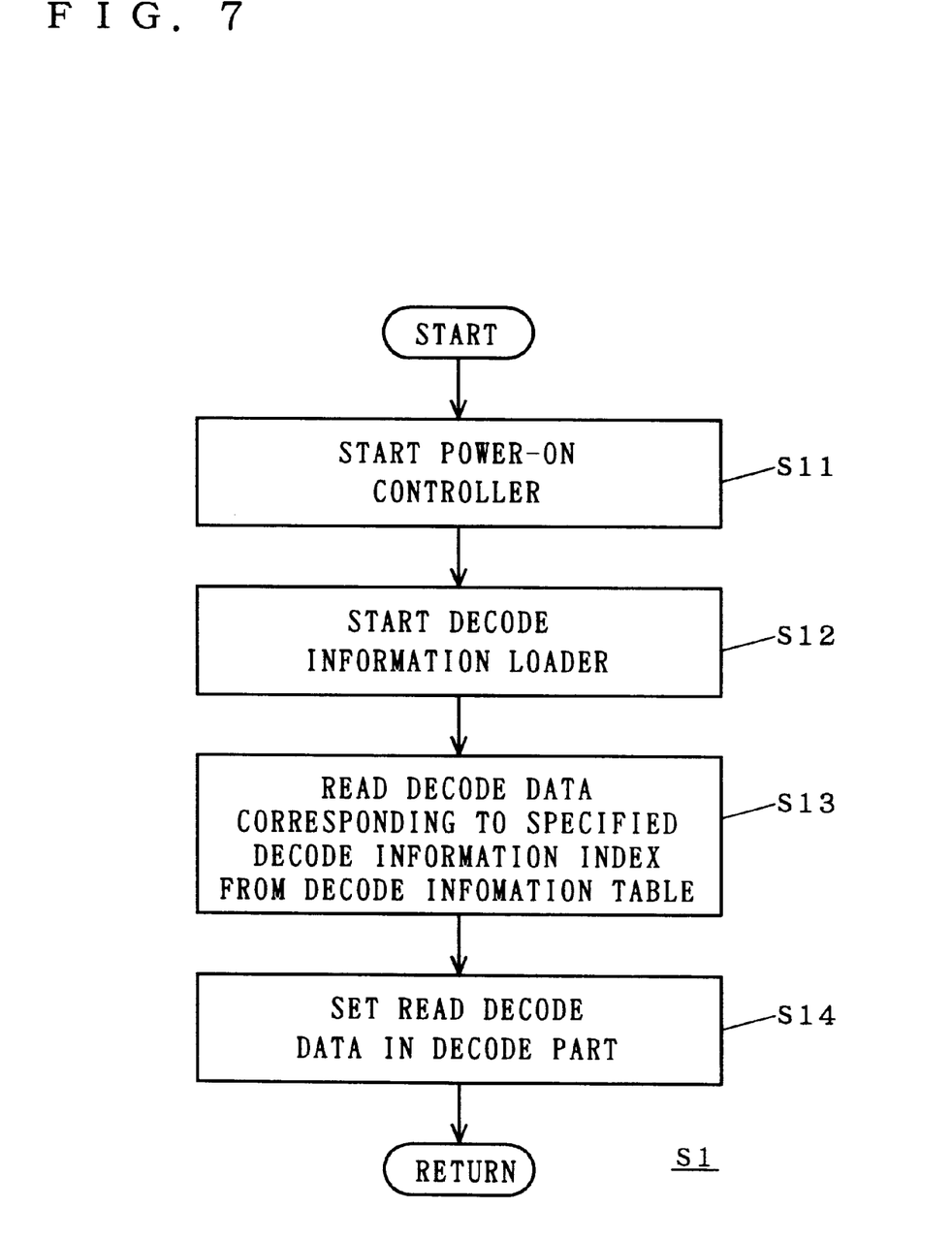
FIG. 7 is a flow chart showing the internal flow of a step S1 in FIG. 6.

FIG. 7 illustrates the internal flow of the step S1. When this step S1 is started, the decode controller 1 starts the power-on controller 11 at a step S11. At a step S12, the power-on controller 11 starts the decode information loader 12, and inputs a decode information index, i.e., an initial index, for identifying one of the decode data D0, D1, D2 or D3 corresponding to the program to be executed first among all programs P0 to P3.

The initial index, which is the value "0", for example, is previously set in the power-on controller 11. In the example shown in FIG. 2, the game selection program P3 is to be first executed and the value (e.g., "0") is allotted to a decode information index I3 corresponding to the game selection program P3. Therefore, the power-on controller 11 inputs the decode information index I3 in the decode information loader 12.

The procedure shifts to a step S13, so that the decode information loader 12 reads the decode data D3 corresponding to the inputted decode information index I3 from the decode information table 21. Then, the decode information loader 12 sets the read decode data D3 in the decode part 13 at a step S14.

Thus, the decode part 13 can execute address conversion following execution of the game selection program P3. Namely, the CPU 91 provided on the game machine 110 can execute the game selection program P3. When the processing at the step S14 is ended, that at the step S1 is completed and the procedure shifts to a step S2 (FIG 6).

At the step S2, the CPU 91 provided on the game machine 110 executes the game selection program P3.

Figure 8:
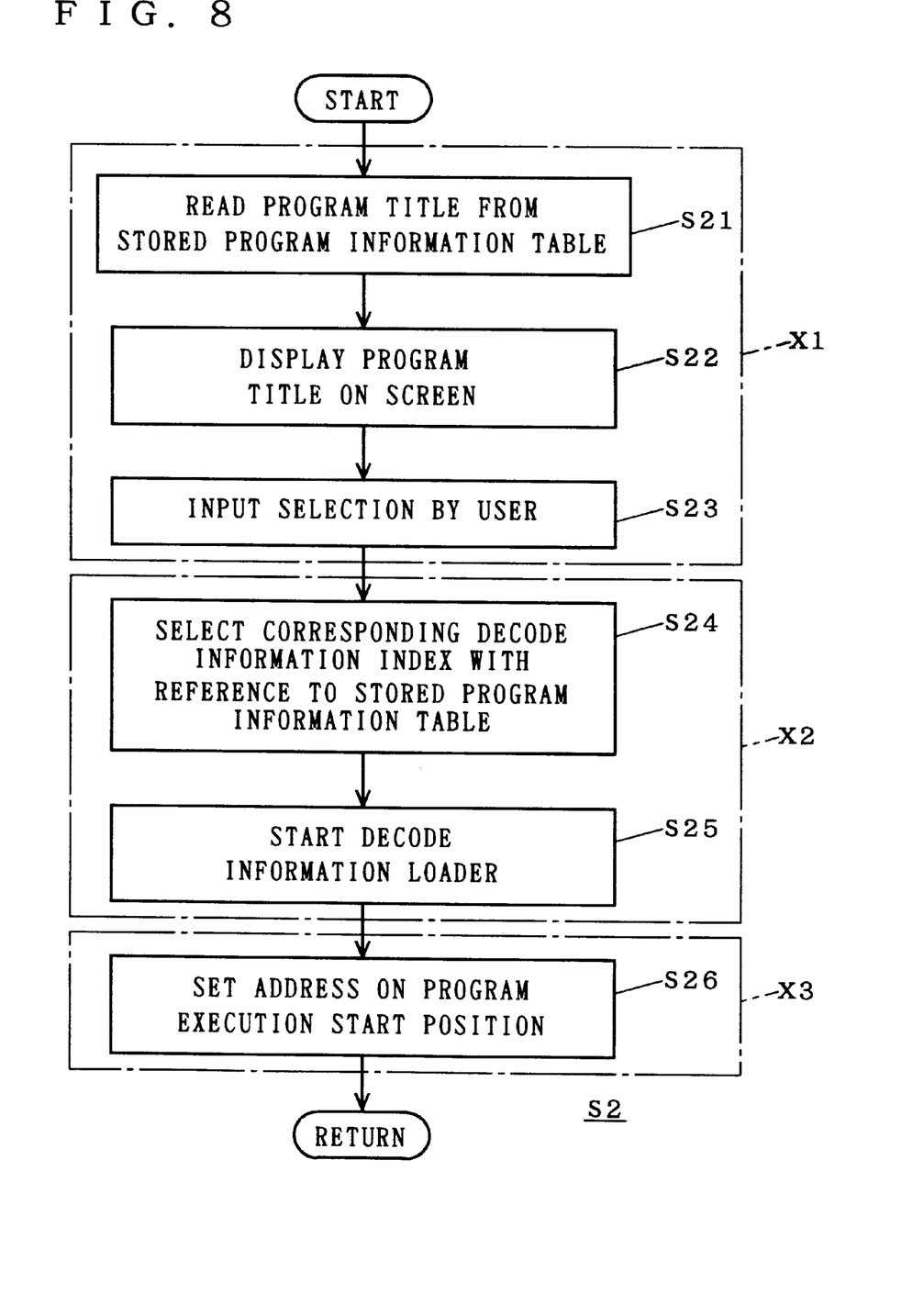
FIG. 8 is a flow chart showing the internal flow of a step S2 in FIG. 6.
Figure 10:
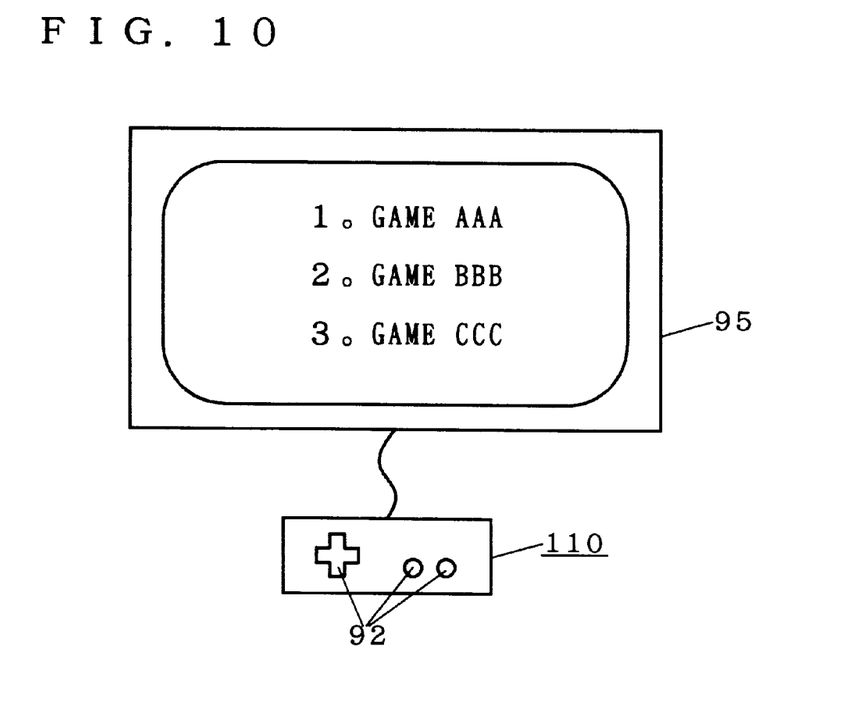
FIG. 10 is an explanatory diagram showing the operation in a step S22 shown in FIG. 8.

FIG. 8 illustrates the internal flow of the step S2. When this step S2 is started, the CPU 91 reads the program titles T0 to T2 from the stored program information table 23 at a step S21, and displays the same on the display unit 95 at a step S22. Consequently, an image shown in FIG. 10 appears on the screen of the display unit 95, for example. The CPU 91 waits until the user makes a selection.

The user can select a desired one of the game machine programs P0 to P2 by operating the input part 92 provided on the game machine 110 while observing the three program titles T0 to T2 (e.g., "1. Game AAA") displayed in correspondence to the game machine programs P0 to P2 respectively. Referring again to FIG. 8, the result of the selection given by the user is inputted in the CPU 91 at a step S23.

The CPU 91 carries out the aforementioned steps S21 to S23 on the basis of the program X1 (see FIG. 4). For convenience of the following description, it is assumed that the user selects the program title T0 for executing the game directed by the game machine program P0.

Then, the procedure shifts to a step S24, so that with reference to the stored program information table 23 provided with the correspondence between the program titles T0 to T2 and the decode information indices I0 to I2, the decode information index I0 corresponding to the program title T0 selected by the user is read out.

Then, the decode information loader 12 is started and the read decode information index I0 is inputted in the decode information loader 12 at a step S25. The aforementioned steps S24 and S25 are carried out on the basis of the program X2 (see FIG. 4).

Then, the procedure shifts to a step S26, so that an address outputted by the CPU 91 is set at a value for starting execution of the game machine program P0 on the basis of the program X3 (FIG. 4). When the processing at the step S26 is ended, the processing at the step S2 based on the game selection program P3 is completed.

Referring again to FIG. 6, the decode information loader 12 performs processing at a step S3 for setting the decode data D0 for the selected game machine program P0 after completion of the step S2 or in parallel with the step S26 following the step S25 (FIG. 8). If the decode controller 1 is formed by a semiconductor integrated circuit requiring no software, the processing at the step S26 based on the game selection program P3 and the processing at the step S3 by the decode controller 1 can be executed in parallel with each other.

Figure 9:
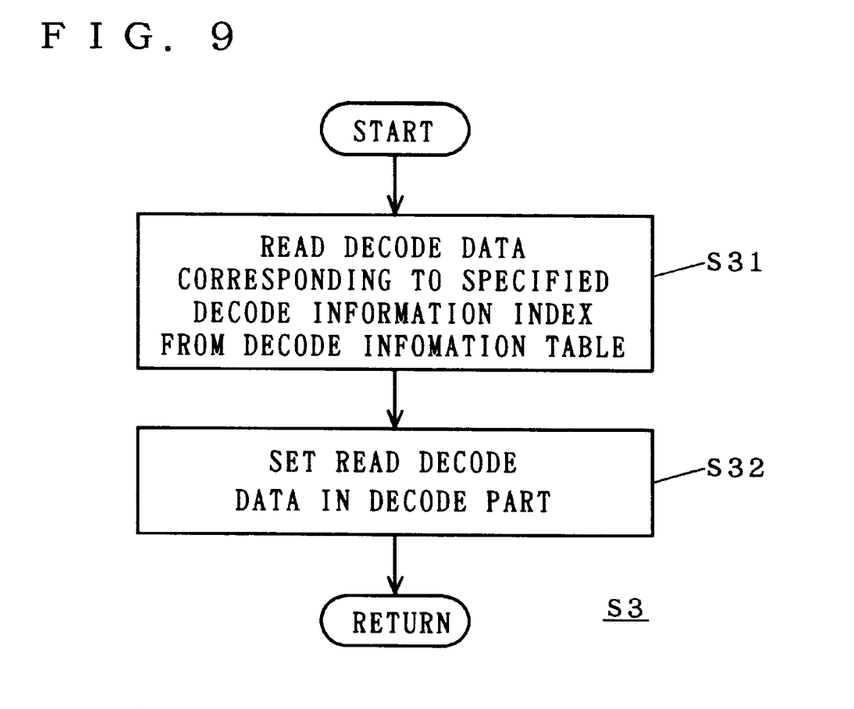
FIG. 9 is a flow chart showing the internal flow of a step S3 in FIG. 6.

FIG. 9 illustrates the internal flow of the step S3. When this step S3 is started, the decode data D0 corresponding to the inputted decode information index I0 is read out from the decode information table 21 at a step S31.

Then, the read decode data D0 is set in the decode part 13 at a step S32. Due to this processing, the decode part 13 can execute address conversion following execution of the game machine program P0 selected by the user. In other words, the CPU 91 provided on the game machine 110 can execute the game machine program P0 upon completion of the processing at the steps S26 and S32. When the processing at the step S32 is ended, the processing at the step S3 is also completed and the procedure shifts to a step S4 (FIG. 6).

At the step S4, the CPU 91 executes processing based on the selected game machine program P0. Consequently, the user can enjoy execution of the game directed by the game machine program P0 selected by himself.

When the user resets the game machine 110 by temporarily turning off the same and supplying power again or operating a reset button (not shown) or the like, the processing is re-started from the step S1. Thus, the user can select and execute a desired one of the plurality of game machine programs P0 to P3 by employing the game cassette unit 100.

The above description has been made with reference to the flash ROM 2 storing the plurality of game machine programs P0 to P2. Alternatively, the game cassette unit 100 can store and operate only a single game machine program. For example, the flash ROM 2 can store only the game machine program P0 for executing the same.

In this case, the game selection program P3 is unnecessary and may not be written in the flash ROM 2. The decode information table 21 stores only the decode data D0. The stored program information table 23, which is unnecessary due to absence of the game selection program P3, is not written. The value (e.g., "0") of the initial index inputted by the power-on controller 11 in the decode information loader 12 is allotted to the decode information index I0.

Thus, the unit 100 performs the processing at the step S1 (FIG. 6), i.e., the processing at the steps S11 to S14 (FIG. 7) upon power supply, to enable execution of the game machine program P0. Thereafter the procedure shifts to the step S4 without through the steps S2 and S3, for executing the game machine program P0.

When the flash ROM 2 stores only a single game machine program, the unit 100 automatically starts execution of the single game machine program with no requirement for a selection by the user. Namely, the game cassette unit 100, which exhibits its original characteristics when storing a plurality of game machine programs and a game selection program, can also serve as a game cassette unit storing a single game machine program.

The game cassette unit 100 having the aforementioned structure and operations provides the following advantages: First, the flash ROM 2 rewritably stores the game machine programs P0 to P2, whereby the user may be simply supplied with a new game machine program and control data therefor through the game machine program rewriter 120 without newly purchasing a game cassette unit when the new game machine program of interest to him is released, thereby saving the expense. This brings effects of cost reduction for manufacturing and selling to the supplier, as a matter of course. In particular, it is possible to cope with resale of a game machine program which has already run out of stock at a low price. Further, the time required for supply is shortened.

In addition, the single game cassette unit 100 stores the plurality of game machine programs P0 to P2 so that the user can select and execute a desired one. Thus, the user can arbitrarily enjoy games directed by the plurality of game machine programs P0 to P2 with only a single game cassette unit 100 as if he possessed a plurality of conventional game cassette units. Thus, the cost required for providing game machine programs and the burden on the user are further reduced.

Further, the game cassette unit 100 rewritably stores the decode data D0 to D2 and the like along with the game machine programs P0 to P2 and the decode controller 1 executes address conversion on the basis of the decode data D0 to D2, whereby it is possible to cope with various specifications accompanying the game machine programs P0 to P2. Namely, the user can make the best use of wide-ranging game machine programs with no barrier of difference among the specifications thereof.

In the aforementioned game cassette unit 100, the flash ROM 2 stores all of the program group 22, the decode information table 21 and the stored program information table 23. However, a general memory capable of holding data in a nonvolatile manner such as an SRAM similar to the SRAM 3, a mask ROM or a combination of an SRAM and a flash ROM, for example, is employable as the memory storing the same.

When an unrewritable memory such as a mask ROM is employed, the user cannot be supplied with a new game machine program through the game machine program rewriter 120. However, such an advantage that an arbitrary one of a plurality of game machine programs is selectively executable can be attained similarly to the game cassette unit 100. Thus, it is also possible to provide game machine programs to the user at a relatively low cost in a short time.

While the invention has been shown and described in detail, the foregoing description is in all aspects illustrative and restrictive. It is therefore understood that numerous modifications and variations can be devised without departing from the scope of the invention.

We claim:

1. A game cassette unit configured to be connected to a game machine having a CPU for a game execution by a user, comprising:

a memory which stores a program group including a game selection program and a plurality of game machine programs, and a plurality of decode data defining address conversion rules for said CPU to execute respective of said game selection program and said game machine programs; and a decode controller configured to execute address conversion based on a selected decode data from said plurality of decode data so that address signals outputted by said CPU are converted and thereafter transmitted to address inputs of said memory;

wherein:

each program belonging to said program group is capable of being executed by said CPU upon a connection of said unit to said game machine;

said game selection program is configured to make said user select one program of said plurality of game machine programs;

said decode controller selects from said plurality of decode data a game selection decode data corresponding to said game selection program upon said connection of said unit to said game machine in order to execute address conversion based on the selected game selection decode data thereby enabling said CPU to execute said game selection program; and said decode controller further selects from said plurality of decode data a game decode data corresponding to a respective game machine program selected by said user when said user selects said one of said plurality of game machine programs during execution of said game selection program in order to execute address conversion on the basis of said game decode data thereby allowing an execution of said selected game machine program.

2. The game cassette unit in accordance with claim 1, wherein said decode controller comprises;

a power-on controller;

a decode information loader; and a decode part;

wherein said decode information loader, when one code of a plurality of codes for identifying a respective of said plurality of decode data is inputted, is configured to selectively read said respective decode data that corresponds to said one code and set the respective decode data on said decode part;

said decode part executes address conversion based on said set decode data;

said power-on controller is configured to input a game selection code of said plurality of codes for identifying said game selection decode data of said plurality of decode data that corresponds to said game selection program into said decode information loader upon said connection of said unit to said game machine; and said game selection program is configured to cause said CPU to input said one code of said plurality of codes for identifying said selected decode data of said plurality of decode data for said selected game machine program into said decode information loader.

3. The game cassette unit in accordance with claim 1, wherein said memory comprises a flash ROM configured to rewritably store said program group and said plurality of decode data.

4. The game cassette unit in accordance with claim 3, wherein said flash ROM comprises:

a special storage area configured to rewritably store said plurality of decode data.

5. The game cassette unit in accordance with claim 1, wherein said decode controller comprises a semiconductor integrated circuit that requires no software.

6. The game cassette unit in accordance with claim 1, wherein said memory comprises a rewritable memory configured to rewritably store said program group and said plurality of decode data.

7. The game cassette unit in accordance with claim 6, further comprising a connector configured to allow said program group and said plurality of decode data to be supplied from exterior of said unit therethrough and to be rewritably stored into said rewritable memory.

8. The game cassette unit in accordance with claim 1, further comprising another memory configured to rewritably store data generated during an execution of any one of said game selection program and said plurality of game machine programs.

9. The game cassette unit in accordance with claim 8, wherein said another memory comprises:

a battery; and a static RAM backed up by said battery.

10. A game cassette unit configured to be connected to a game machine having a CPU for a game execution by a user, comprising:

a memory configured to store a program group that is configured to be executed by said CPU upon a connection of said unit to said game machine, said program group including a game selection program configured to make said user select one program of a plurality of game machine programs, and said plurality of game machine programs;

a plurality of decode data that define address conversion rules for said CPU for use by the CPU in execution of programs belonging to said program group; and a decode controller configured to first select from said plurality of decode data a game selection decode data of said plurality of decode data that corresponds to said game selection program upon said connection of said unit to said game machine in order to execute an address conversion based on said game selection decode data so that address signals outputted by said CPU are converted and thereafter transmitted to address inputs of said memory thereby allowing said CPU to execute said game selection program, and to further select a selected decode data corresponding to a selected game machine program selected by said user when said user selects said selected game machine program of said plurality of game machine programs during execution of said game selection program in order to execute address conversion on the basis of said selected decode data so that address signals outputted by said CPU are converted and thereafter transmitted to address inputs of said memory thereby allowing an execution of said selected game machine program.

11. The game cassette unit in accordance with claim 10, wherein said decode controller comprises:

a decode information loader configured to selectively read a respective decode data of said plurality of decode data in correspondence with an inputted code of a plurality of codes that identifies said respective decode data of said plurality of decode data and to set said respective decode data on said decode part when said inputted code is inputted;

a power-on controller configured to input as said inputted code into said decode information loader a game selection code that identifies a game selection decode data of said plurality of decode data that corresponds to said game selection program upon said connection of said unit to said game machine; and a decode part configured to execute an address conversion based on said respective decode data;

wherein said game selection program is configured to cause said CPU to input into said decode information loader a code of said plurality of codes that identifies the decode data of said plurality of decode data that corresponds to the selected game machine program.

* * * * *